United States Patent
Tamaki

(10) Patent No.: US 10,139,759 B2
(45) Date of Patent: Nov. 27, 2018

(54) IMAGE FORMING APPARATUS

(71) Applicant: KONICA MINOLTA, INC., Chiyoda-ku, Tokyo (JP)

(72) Inventor: Kenji Tamaki, Tokorozawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/902,675

(22) Filed: Feb. 22, 2018

(65) Prior Publication Data

US 2018/0253040 A1    Sep. 6, 2018

(30) Foreign Application Priority Data

Mar. 3, 2017    (JP) .................................. 2017-040455

(51) Int. Cl.
*G03G 15/20*    (2006.01)
*G03G 15/00*    (2006.01)
*H04N 1/00*    (2006.01)

(52) U.S. Cl.
CPC ..... *G03G 15/2003* (2013.01); *G03G 15/5004* (2013.01); *H04N 1/00904* (2013.01); *H04N 2201/0094* (2013.01)

(58) Field of Classification Search
CPC .............................................. G03G 15/2003
USPC .......................................................... 399/88
See application file for complete search history.

(56) References Cited

U.S. PATENT DOCUMENTS

2014/0363188 A1    12/2014    Akamatsu
2017/0363995 A1*   12/2017    Takagi ............... G03G 15/2007

FOREIGN PATENT DOCUMENTS

| JP | 2003-244359 A | 8/2003 |
| JP | 2013-140253 A | 7/2013 |
| JP | 2013-140254 A | 7/2013 |
| JP | 2015059992 A * | 3/2015 |

* cited by examiner

*Primary Examiner* — Quana M Grainger
(74) *Attorney, Agent, or Firm* — Buchanan Ingersoll & Rooney PC

(57) ABSTRACT

An image forming apparatus includes: a fixer that includes a first heater group including first heaters and a second heater group including second heaters; a first power cord that supplies AC power to the first heater group; a second power cord that supplies AC power to the second heater group; first switches that switch a power supply state to the first heaters; second switches that switch a power supply state to the second heaters; and a hardware processor that independently controls the lightings of the first and second heater groups by controlling the first and second switches based on an array pattern for turning on or off the first and second heaters, wherein the array pattern includes an on period and an off period whose lengths are both a half wave cycle of an AC power supply, and is set to satisfy a flicker regulation value.

13 Claims, 15 Drawing Sheets

FIG. 4

| HEATER | NUMBER OF LIGHTING | Duty | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| HEATER 212 | 8 | 53.3% | 1 | 1 | 1 | 0 | 0 | 1 | 1 | 0 | 1 | 0 | 0 | 1 | 0 | 0 | 1 |
| HEATER 214 | 4 | 26.7% | 0 | 0 | 0 | 1 | 0 | 0 | 1 | 0 | 0 | 1 | 0 | 0 | 1 | 0 | 0 |
| HEATER 216 | 4 | 26.7% | 0 | 0 | 0 | 0 | 1 | 0 | 0 | 0 | 1 | 0 | 1 | 0 | 0 | 1 | 0 |

FIG. 5

| HEATER | NUMBER OF LIGHTING | Duty | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| HEATER 222 | 14 | 93.3% | 1 | 1 | 1 | 1 | 1 | 1 | 1 | 1 | 0 | 1 | 1 | 1 | 1 | 1 | 1 |
| HEATER 224 | 4 | 26.7% | 0 | 1 | 0 | 0 | 0 | 1 | 0 | 0 | 0 | 1 | 0 | 0 | 0 | 1 | 0 |
| HEATER 226 | 14 | 93.3% | 1 | 0 | 1 | 1 | 1 | 1 | 1 | 1 | 1 | 1 | 1 | 1 | 1 | 1 | 1 |

FIG. 6

| HEATER | NUMBER OF LIGHTING | Duty | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| HEATER 212 | 8 | 53.3% | 1 | 1 | 0 | 1 | 0 | 1 | 1 | 0 | 0 | 1 | 1 | 0 | 1 | 0 | 0 |
| HEATER 214 | 4 | 26.7% | 0 | 0 | 0 | 0 | 0 | 0 | 1 | 1 | 0 | 0 | 0 | 0 | 1 | 1 | 0 |
| HEATER 216 | 6 | 40.0% | 0 | 1 | 0 | 1 | 1 | 0 | 0 | 0 | 1 | 0 | 1 | 0 | 0 | 0 | 1 |

FIG. 7

| HEATER | NUMBER OF LIGHTING | Duty | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| HEATER 212 | 8 | 53.3% | 1 | 1 | 0 | 1 | 1 | 0 | 0 | 1 | 1 | 0 | 0 | 1 | 1 | 0 | 0 |
| HEATER 214 | 4 | 26.7% | 0 | 0 | 0 | 0 | 0 | 1 | 0 | 0 | 0 | 1 | 0 | 0 | 1 | 1 | 0 |
| HEATER 216 | 8 | 53.3% | 1 | 0 | 1 | 0 | 1 | 1 | 1 | 0 | 1 | 0 | 1 | 0 | 0 | 0 | 1 |

FIG. 10

| HEATER | NUMBER OF LIGHTING | Duty | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| HEATER 212 | 12 | 80.0% | 1 | 1 | 1 | 1 | 0 | 1 | 1 | 1 | 1 | 0 | 1 | 1 | 1 | 1 | 0 |
| HEATER 214 | 12 | 80.0% | 1 | 1 | 0 | 1 | 1 | 1 | 1 | 0 | 1 | 1 | 1 | 1 | 0 | 1 | 1 |
| HEATER 216 | 12 | 80.0% | 1 | 0 | 1 | 1 | 1 | 1 | 0 | 1 | 1 | 1 | 1 | 0 | 1 | 1 | 1 |

FIG. 11

| HEATER | NUMBER OF LIGHTING | Duty | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| HEATER 212 | 10 | 66.7% | 1 | 1 | 0 | 1 | 1 | 0 | 1 | 1 | 0 | 1 | 1 | 0 | 1 | 1 | 0 |
| HEATER 214 | 10 | 66.7% | 1 | 0 | 1 | 1 | 0 | 1 | 1 | 0 | 1 | 1 | 0 | 1 | 1 | 0 | 1 |
| HEATER 216 | 10 | 66.7% | 0 | 1 | 1 | 0 | 1 | 1 | 0 | 1 | 1 | 0 | 1 | 1 | 0 | 1 | 1 |

FIG. 12

| HEATER | NUMBER OF LIGHTING | Duty | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| HEATER 212 | 6 | 40.0% | 0 | 0 | 0 | 1 | 1 | 0 | 1 | 0 | 1 | 0 | 0 | 0 | 1 | 0 | 1 |
| HEATER 214 | 6 | 40.0% | 0 | 1 | 0 | 1 | 0 | 1 | 0 | 0 | 0 | 1 | 1 | 0 | 1 | 0 | 0 |
| HEATER 216 | 6 | 40.0% | 1 | 1 | 0 | 0 | 0 | 0 | 1 | 1 | 0 | 0 | 1 | 0 | 0 | 1 | 0 |

FIG. 13

| HEATER | NUMBER OF LIGHTING | Duty | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| HEATER 212 | 3 | 20.0% | 0 | 1 | 0 | 0 | 0 | 0 | 1 | 0 | 0 | 0 | 0 | 1 | 0 | 0 | 0 |
| HEATER 214 | 3 | 20.0% | 0 | 0 | 1 | 0 | 0 | 0 | 0 | 1 | 0 | 0 | 0 | 0 | 1 | 0 | 0 |
| HEATER 216 | 3 | 20.0% | 0 | 0 | 0 | 0 | 1 | 0 | 0 | 0 | 0 | 1 | 0 | 0 | 0 | 0 | 1 |

FIG. 14

| HEATER | NUMBER OF LIGHTING | Duty | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| HEATER 214 | 8 | 53.3% | 0 | 1 | 0 | 1 | 0 | 1 | 1 | 0 | 1 | 0 | 1 | 0 | 1 | 0 | 1 |

FIG. 15

| HEATER | NUMBER OF LIGHTING | Duty | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| HEATER 212 | 5 | 33.3% | 0 | 0 | 1 | 0 | 0 | 0 | 1 | 0 | 0 | 1 | 0 | 0 | 1 | 0 | 0 |
| HEATER 214 | 4 | 26.7% | 0 | 1 | 0 | 0 | 1 | 0 | 0 | 1 | 0 | 0 | 0 | 1 | 0 | 0 | 1 |

FIG. 16

| HEATER | NUMBER OF LIGHTING | Duty | 1 | 2 | 3 | 4 | 5 | 6 | 7 | 8 | 9 | 10 | 11 | 12 | 13 | 14 | 15 | STANDARD A | STANDARD B |
|---|---|---|---|---|---|---|---|---|---|---|---|---|---|---|---|---|---|---|---|
| HEATER 212 | 4 | 26.7% | 0 | 0 | 0 | 1 | 0 | 1 | 0 | 0 | 0 | 1 | 0 | 0 | 1 | 0 | 0 | | |
| HEATER 214 | 4 | 26.7% | 1 | 0 | 0 | 1 | 0 | 0 | 1 | 0 | 0 | 0 | 1 | 0 | 0 | 0 | 0 | 0.715 | 0.451 |
| HEATER 216 | 4 | 26.7% | 0 | 1 | 0 | 0 | 0 | 0 | 0 | 1 | 0 | 0 | 0 | 0 | 1 | 0 | 1 | | |

FIG. 17

| HEATER | NUMBER OF LIGHTING | Duty | 1 | 2 | 3 | 4 | 5 | 6 | 7 | 8 | 9 | 10 | 11 | 12 | 13 | 14 | 15 | STANDARD A | STANDARD B |
|---|---|---|---|---|---|---|---|---|---|---|---|---|---|---|---|---|---|---|---|
| HEATER 212 | 3 | 20.0% | 0 | 0 | 0 | 0 | 0 | 0 | 1 | 0 | 0 | 1 | 0 | 0 | 1 | 0 | 0 | | |
| HEATER 214 | 4 | 26.7% | 1 | 0 | 0 | 1 | 0 | 0 | 1 | 0 | 0 | 0 | 1 | 0 | 0 | 0 | 0 | 0.891 | 0.745 |
| HEATER 216 | 7 | 46.7% | 1 | 1 | 0 | 1 | 1 | 0 | 0 | 1 | 0 | 0 | 0 | 0 | 0 | 1 | 1 | | |

DEEP SIDE
NEAR SIDE

FIG. 21

| NUMBER OF LIGHTING | Duty | 1 | 2 | 3 | 4 | 5 | 6 | 7 | 8 | 9 | 10 | 11 | 12 | 13 | 14 | 15 | FLICKER VALUE |
|---|---|---|---|---|---|---|---|---|---|---|---|---|---|---|---|---|---|
| 3 | 0.2 | 0 | 0 | 0 | 0 | 0 | 1 | 0 | 1 | 0 | 0 | 0 | 0 | 0 | 0 | 1 | |
| 5 | 0.333 | 1 | 0 | 1 | 0 | 0 | 0 | 0 | 0 | 1 | 0 | 1 | 0 | 0 | 1 | 0 | 1.073 |
| 6 | 0.4 | 0 | 0 | 1 | 1 | 0 | 1 | 0 | 0 | 1 | 0 | 0 | 1 | 1 | 0 | 0 | |

FIG. 22

| NUMBER OF LIGHTING | Duty | 1 | 2 | 3 | 4 | 5 | 6 | 7 | 8 | 9 | 10 | 11 | 12 | 13 | 14 | 15 | FLICKER VALUE |
|---|---|---|---|---|---|---|---|---|---|---|---|---|---|---|---|---|---|
| 6 | 0.4 | 0 | 1 | 0 | 1 | 1 | 0 | 0 | 0 | 0 | 0 | 1 | 1 | 0 | 1 | 0 | |
| 12 | 0.8 | 1 | 0 | 1 | 0 | 1 | 1 | 1 | 1 | 1 | 1 | 0 | 1 | 1 | 1 | 1 | 1.075 |
| 12 | 0.8 | 1 | 1 | 1 | 1 | 0 | 1 | 1 | 1 | 1 | 1 | 1 | 0 | 1 | 0 | 1 | |

FIG. 23

| NUMBER OF LIGHTING | Duty | 1 | 2 | 3 | 4 | 5 | 6 | 7 | 8 | 9 | 10 | 11 | 12 | 13 | 14 | 15 | FLICKER VALUE |
|---|---|---|---|---|---|---|---|---|---|---|---|---|---|---|---|---|---|
| 10 | 0.667 | 0 | 0 | 1 | 0 | 0 | 1 | 1 | 0 | 1 | 1 | 1 | 1 | 1 | 1 | 1 | |
| 7 | 0.467 | 0 | 1 | 0 | 1 | 0 | 1 | 0 | 1 | 1 | 1 | 0 | 0 | 0 | 0 | 1 | 0.849 |
| 9 | 0.6 | 1 | 1 | 1 | 1 | 1 | 0 | 1 | 0 | 0 | 0 | 1 | 1 | 0 | 1 | 0 | |

FIG. 24

| NUMBER OF LIGHTING | Duty | 1 | 2 | 3 | 4 | 5 | 6 | 7 | 8 | 9 | 10 | 11 | 12 | 13 | 14 | 15 | FLICKER VALUE |
|---|---|---|---|---|---|---|---|---|---|---|---|---|---|---|---|---|---|
| 3 | 0.2 | 0 | 1 | 0 | 0 | 0 | 0 | 0 | 1 | 0 | 0 | 0 | 1 | 0 | 0 | 0 | |
| 5 | 0.333 | 0 | 0 | 1 | 0 | 1 | 0 | 0 | 0 | 0 | 1 | 0 | 1 | 0 | 1 | 0 | 0.677 |
| 6 | 0.4 | 1 | 0 | 0 | 1 | 1 | 0 | 1 | 0 | 0 | 1 | 0 | 0 | 0 | 0 | 1 | |

FIG. 25

| NUMBER OF LIGHTING | Duty | 1 | 2 | 3 | 4 | 5 | 6 | 7 | 8 | 9 | 10 | 11 | 12 | 13 | 14 | 15 | FLICKER VALUE |
|---|---|---|---|---|---|---|---|---|---|---|---|---|---|---|---|---|---|
| 6 | 0.4 | 1 | 1 | 0 | 0 | 0 | 1 | 1 | 0 | 0 | 0 | 1 | 1 | 0 | 0 | 0 | |
| 12 | 0.8 | 0 | 1 | 1 | 1 | 1 | 1 | 0 | 1 | 1 | 1 | 1 | 0 | 1 | 1 | 1 | 0.636 |
| 12 | 0.8 | 1 | 0 | 1 | 1 | 1 | 0 | 1 | 1 | 1 | 1 | 0 | 1 | 1 | 1 | 1 | |

FIG. 26

| NUMBER OF LIGHTING | Duty | 1 | 2 | 3 | 4 | 5 | 6 | 7 | 8 | 9 | 10 | 11 | 12 | 13 | 14 | 15 | FLICKER VALUE |
|---|---|---|---|---|---|---|---|---|---|---|---|---|---|---|---|---|---|
| 10 | 0.667 | 1 | 1 | 1 | 1 | 0 | 1 | 0 | 1 | 0 | 1 | 0 | 1 | 1 | 1 | 0 | |
| 7 | 0.467 | 0 | 1 | 0 | 1 | 0 | 0 | 1 | 1 | 0 | 0 | 1 | 1 | 0 | 0 | 1 | 0.551 |
| 9 | 0.6 | 0 | 0 | 1 | 0 | 1 | 1 | 1 | 0 | 1 | 1 | 1 | 0 | 0 | 1 | 1 | |

IMAGE FORMING APPARATUS

The entire disclosure of Japanese patent Application No. 2017-040455, filed on Mar. 3, 2017, is incorporated herein by reference in its entirety.

BACKGROUND

Technological Field

The present invention relates to an image forming apparatus.

Description of the Related Art

Hitherto, an image forming apparatus which adopts an electrophotographic system has been widely known as a printer, a copy machine, and the like. In the image forming apparatus, an image is formed on a sheet by a series of processes in which a toner image is transferred onto a sheet by an image forming part and the toner image is fixed onto the sheet by a fixing device. The fixing device includes a plurality of fixing heaters used for a heat-fixing process.

In recent years, there has been a demand to perform an image forming process at a high speed for the purpose of improving productivity. In accordance with such a demand, the wattage of a fixing heater and the wattage of a motor are increased and thus the power consumption of an image forming apparatus is increased. In addition, there is a tendency that a high-voltage load increases even by the colorization and high accuracy and power consumption of the image forming apparatus further increases. Further, since an AC power supply which is a power source of the image forming apparatus is restricted by an outlet standard, there is a need to use the image forming apparatus below this standard value.

Here, there is known a configuration in which power is supplied through a plurality of power cords as an image forming apparatus having large power consumption. For example, JP 2003-244359 A discloses an image forming apparatus which includes first and second power cords having a rated standard of 100 V and 15 A and in which the first power cord is connected to a fixing controller and the second power cord is connected to an AC/DC converter. Further, JP 2013-140253 A discloses an image forming apparatus in which a DC power supply and a first fixing heater are connected to a control system power cord and second to fourth fixing heaters are connected to a fixing system power cord. Further, JP 2013-140254 A discloses an image forming apparatus which switches a relay from a disconnection state to a connection state when the supply of power via one of two power cords is interrupted and sequentially selects processing units based on a priority rank to drive a load device included in the selected processing unit.

Incidentally, when the image forming apparatus is left in a low-temperature environment such as a winter or a nighttime, the fixing heater also has a low temperature and thus the resistance of the fixing heater is also usually a small. When the fixing heater lights up in such a state, an inrush current tends to increase. Accordingly, there is a problem that flicker occurs as the inrush current increases. In the above-described image forming apparatuses disclosed in JP 2003-244359 A, JP 2013-140253 A, and JP 2013-140254 A, the plurality of fixing heaters are controlled to light up via the plurality of power cords. However, since there is no consideration about an array pattern of on (a light-on state) and off (a light-off state) at the time of performing the lighting control of each fixing heater, a problem arises in that the occurrence of the flicker cannot be effectively prevented.

SUMMARY

Here, the present invention has been made in view of the above-described circumstances, and an object of the present invention is to provide an image forming apparatus capable of effectively suppressing occurrence of flicker even when a plurality of power cords is used in a fixing device.

To achieve the abovementioned object, according to an aspect of the present invention, an image forming apparatus reflecting one aspect of the present invention comprises: a fixer that includes a first heater group including a plurality of first heaters and a second heater group including a plurality of second heaters; a first power cord that supplies AC power to the first heater group; a second power cord that supplies AC power to the second heater group; a plurality of first switches that is provided between the first heaters and the first power cord and switches a power supply state to the first heaters; a plurality of second switches that is provided between the second heaters and the second power cord and switches a power supply state to the second heaters; and a hardware processor that independently controls the lightings of the first and second heater groups by controlling the plurality of first and second switches based on an array pattern for turning on or off the first and second heaters, wherein the array pattern for turning on or off the first and second heaters comprises an on period and an off period whose lengths are both a half wave cycle of an AC power supply, and is set to satisfy a flicker regulation value.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 4 is a diagram illustrating a configuration example of an array pattern in a case where each of heaters of a first heater group is controlled to light up at a predetermined duty ratio;

FIG. 5 is a diagram illustrating a configuration example of an array pattern in a case where each of heaters of a second heater group is controlled to light up at a predetermined duty ratio;

FIG. 6 is a diagram illustrating a configuration example of an array pattern in a case where a duty ratio of only one heater in the first heater group illustrated in FIG. 4 is changed;

FIG. 7 is a diagram illustrating a configuration example of an array pattern in a case where a duty ratio of only one heater in the first heater group illustrated in FIG. 4 is changed;

FIG. 10 is a diagram illustrating a configuration example of an array pattern in a case where the duty ratio of the first heater group is 80%;

FIG. 11 is a diagram illustrating a configuration example of an array pattern in a case where the duty ratio of the first heater group is 66.7%;

FIG. 12 is a diagram illustrating a configuration example of an array pattern in a case where the duty ratio of the first heater group is 40%;

FIG. 13 is a diagram illustrating a configuration example of an array pattern in a case where the duty ratio of the first heater group is 20%;

FIG. 14 is a diagram illustrating a configuration example of an array pattern when performing lighting control by one heater in the first heater group in a case where the duty ratio of the first heater group is 20%;

FIG. 15 is a diagram illustrating a configuration example of an array pattern when performing lighting control by two heaters in the first heater group in a case where the duty ratio of the first heater group is 20%;

FIG. 16 is a diagram illustrating a measurement result of each flicker standard and a configuration example of an array pattern in a case where each heater in a first heater group has a predetermined duty ratio in an image forming apparatus according to a second embodiment of the present invention;

FIG. 17 is a diagram illustrating a measurement result of each flicker standard and a configuration example of an array pattern in a case where the heater in the first heater group has a predetermined duty ratio;

FIG. 21 is a diagram illustrating an example of an array pattern which does not satisfy a flicker specified value;

FIG. 22 is a diagram illustrating an example of an array pattern which does not satisfy a flicker specified value;

FIG. 23 is a diagram illustrating an example of an array pattern which does not satisfy a flicker specified value;

FIG. 24 is a diagram illustrating an example of an array pattern which satisfies a flicker specified value;

FIG. 25 is a diagram illustrating an example of an array pattern which satisfies a flicker specified value; and FIG. 26 is a diagram illustrating an example of an array pattern which satisfies a flicker specified value.

DETAILED DESCRIPTION OF EMBODIMENTS

Figure 1:
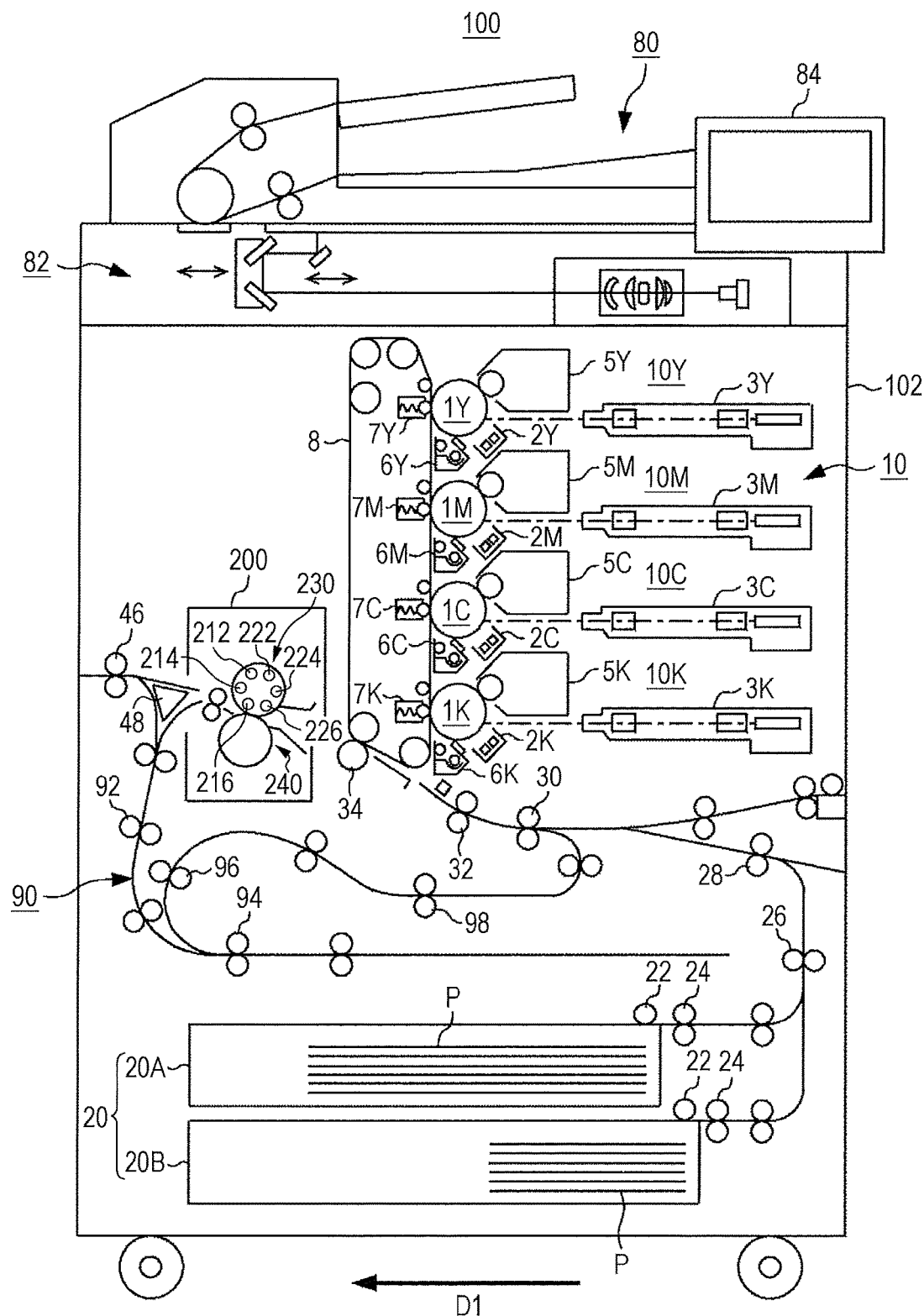
FIG. 1 is a diagram illustrating a configuration example of an image forming apparatus according to an embodiment of the present invention.

Hereinafter, one or more preferred embodiments of the present invention will be described in detail with reference to the drawings. However, the scope of the invention is not limited to the disclosed embodiments. In addition, dimension ratios in the drawings are enlarged for convenience of description and may differ from the actual ratios.

First Embodiment

[Configuration Example of Image Forming Apparatus 100]

FIG. 1 illustrates a configuration example of an image forming apparatus 100 according to the present invention. As illustrated in FIG. 1, the image forming apparatus 100 is referred to as a tandem type image forming apparatus and includes an automatic document feeder 80 and an apparatus body 102. The automatic document feeder 80 is attached to an upper part of the apparatus body 102 and sends a sheet set on a carriage to an image reader 82 of the apparatus body 102 by a conveying roller.

The apparatus body 102 includes an operation display part 84, the image reader 82, an image forming part 10, an intermediate transfer belt 8, a feeder 20, a registration roller 32, a fixing unit 200, and an automatic reversing and conveying unit (Auto Duplex Unit: hereinafter, ADU) 90.

The operation display part 84 includes a touch panel obtained by a combination of a display part and an input part and a plurality of operation keys including a start key or a decision key provided in the periphery of the touch panel. The operation display part 84 is used to display a menu screen or the like on a screen or to receive information such as a fixing condition or an image forming condition input by the operation of operation keys or the touch operation on the menu screen.

The image reader 82 scans and exposes a document placed on a document platen or a document conveyed by the automatic document feeder 80 and photoelectrically converts an image of the scanned document by a charge coupled device (CCD) image sensor to generate an image information signal. The image information signal is subjected to an analog process, an analog/digital (hereinafter, A/D) conversion process, a shading correction process, and an image compressing process by an image processing unit (not illustrated) and is output to the image forming part 10.

The image forming part 10 is used to form an image by an electrophotographic system and includes an image forming unit 10Y which forms an image of yellow (Y), an image forming unit IOM which forms an image of magenta (M), an image forming unit 10C which forms an image of cyan (C), and an image forming unit 10K which forms an image of black (K). In this example, common function names, for example, Y, M, C, and K indicating the colors to be formed after Reference Numeral 10 are added for description.

The image forming unit 10Y includes a photosensitive drum 1Y and also includes a charging part 2Y, an exposure part (an optical writing part) 3Y, a development device 5Y, and a cleaning part 6Y disposed in the periphery of the photosensitive drum. The image forming unit 10M includes a photosensitive drum 1M and also includes a charging part 2M, an exposure part 3M, a development device 5M, and a cleaning part 6M disposed in the periphery of the photosensitive drum. The image forming unit 10M includes a photosensitive drum 1M and also includes a charging part 2C, an exposure part 3C, a development device 5C, and a cleaning part 6C disposed in the periphery of the photosensitive drum. The image forming unit 10K includes a photosensitive drum 1K and a charging part 2K, an exposure part 3K, a development device 5K, and a cleaning part 6K disposed in the periphery of the photosensitive drum.

The photosensitive drums (the image carriers) 1Y, 1M, 1C, and 1K, the charging parts 2Y, 2M, 2C, and 2K, the exposure parts 3Y, 3M, 3C, and 3K, the development devices 5Y, 5M, 5C, and 5K, the cleaning parts 6Y, 6M, 6C, and 6K, and primary transfer rollers 7Y, 7M, 7C, and 7K of the image forming units 10Y, 10M, IOC, and 10K respectively the same configuration. Hereinafter, Y, M, C, and K are not added to the reference numerals unless there is no need to particularly distinguish components.

The charging part 2 uniformly charges a surface of the photosensitive drum I. The exposure part 3 is configured as, for example, an LED print head (LPH) with an LED array and an imaging lens or a laser exposure scanning device of a polygon mirror type and forms an electrostatic latent image by scanning a surface of the photosensitive drum 1 by a laser beam based on the image information signal. The development device 5 develops the electrostatic latent image formed on the photosensitive drum 1 by toner. Accordingly, a toner image which is a visual image is formed on the photosensitive drum 1.

The intermediate transfer belt 8 is suspended by a plurality of rollers and is supported to be rotatable. When the primary transfer roller 7 and the photosensitive drum 1 rotate in accordance with the rotation of the intermediate transfer belt 8 and a predetermined voltage is applied across the primary transfer roller 7 and the photosensitive drum 1, the toner image formed on the photosensitive drum 1 is transferred onto the intermediate transfer belt 8 (primary transfer).

The feeder 20 includes a plurality of sheet feeding trays 20A and 20B which accommodates sheets P of A3 or A4. The sheet P which is conveyed from the sheet feeding trays 20A and 20B by conveying rollers 22, 24, 26, and 28 is conveyed by the registration roller 32. In addition, the number of the sheet feeding trays is not limited to two. Further, one or more high-capacity sheet feeders capable of accommodating a large number of sheets P may be connected if necessary.

The registration roller 32 corrects the bending of the sheet P by forming a loop in such a manner that a leading end of the sheet P contacts a pair of loop rollers 30. The sheet P of which the bending is corrected is conveyed to a secondary transfer roller 34 at a predetermined timing. In the secondary transfer roller 34, the toner images of Y, M, C, and K colors transferred onto the intermediate transfer belt 8 are transferred onto the front surface of the sheet P at one time (secondary transfer). The sheet P onto which the toner images are secondarily transferred is conveyed to the fixing unit 200 at the downstream side in a sheet conveying direction D1.

The fixing unit 200 includes a pressing roller and a heating roller. The fixing unit 200 fixes the toner image on the front surface of the sheet P onto the sheet P by pressing and heating the sheet P onto which the toner image is transferred by the secondary transfer roller 34.

A conveying path switching part 48 which changes a conveying path of the sheet P to a sheet discharging path or the ADU 90 is provided at the downstream side of the fixing unit 200 in the sheet conveying direction D1. The conveying path switching part 48 performs conveying path switching control based on a selected print mode (a single-side printing mode, a duplex printing mode, or the like).

The sheet P having been subjected to a single-side printing process in the single-side printing mode or the sheet P having been subjected to a duplex printing process in the duplex printing mode is discharged onto a sheet discharging tray by a sheet discharging roller 46.

Further, when an image is formed on the rear surface side of the sheet P in the duplex printing mode, the sheet P having an image formed on the front surface side is conveyed to the ADU 90 through a conveying roller 92 and the like. In a switchback path of the ADU 90, the sheet P is conveyed to a U-turn path while a tail end of the sheet P is located at a front side by a reverse rotation control of an ADU roller 94 and is fed to the secondary transfer roller 34 again while the front and rear surfaces are reversed by conveying rollers 96 and 98 provided in the U-turn path.

[Block Configuration Example of Image Forming Apparatus 100]

Figure 2:
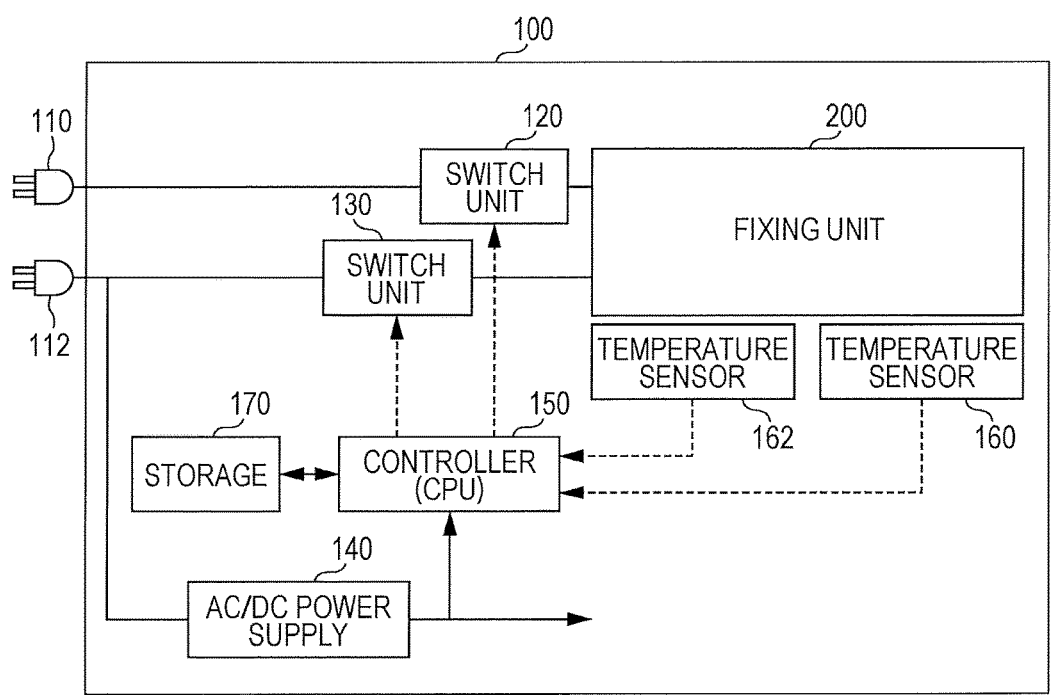
FIG. 2 is a block diagram illustrating a functional configuration of an image forming apparatus according to a first embodiment of the present invention.
Figure 3:
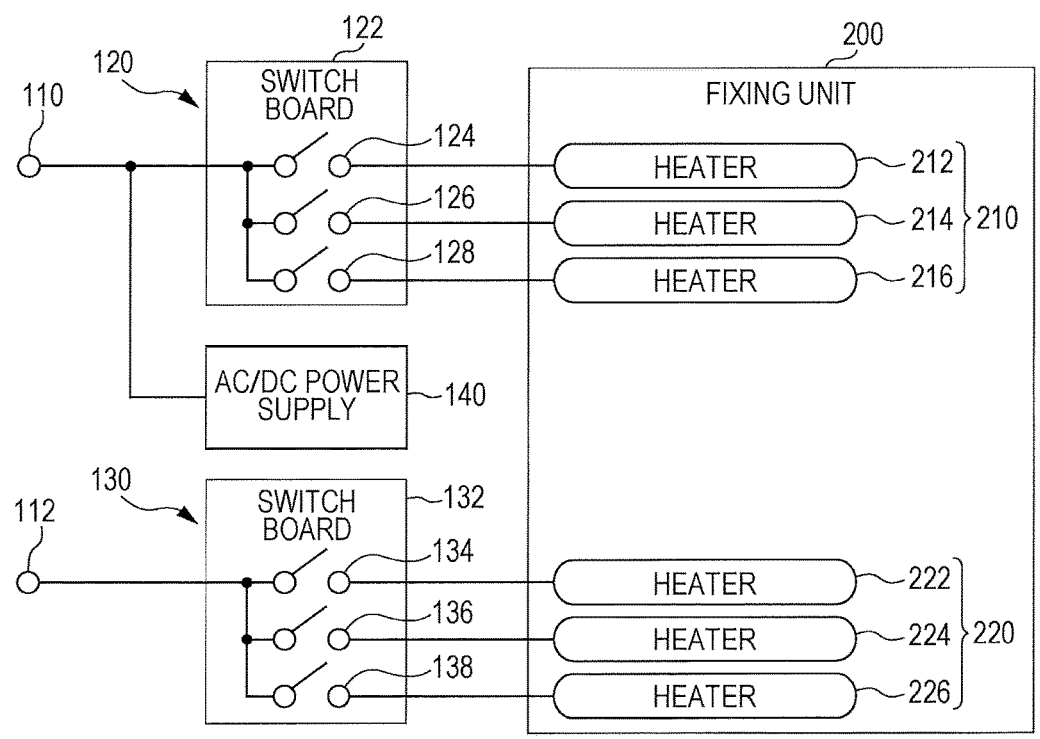
FIG. 3 is a block diagram illustrating an example of a functional configuration of a switch unit and a fixing unit.

FIG. 2 is a block diagram illustrating an example of a functional configuration of the image forming apparatus 100 according to an embodiment of the present invention. FIG. 3 is a block diagram illustrating an example of a functional configuration of switch units 120 and 130 and a fixing unit 200.

As illustrated in FIGS. 2 and 3, the image forming apparatus 100 includes power cords 110 and 112, switch units 120 and 130, an AC/DC power supply 140, a controller 150, temperature sensors 160 and 162, a storage 170, and a fixing unit 200. In addition, the power cord 110 corresponds to a first power cord and the power cord 112 corresponds to a second power cord. Further, the switch unit 120 corresponds to a first switching part and the switch unit 130 corresponds to a second switching part.

Each of the power cords 110 and 112 is connectable to an AC power supply and supplies AC power from the AC power supply to the controller 150 or the fixing unit 200 of the image forming apparatus 100. The AC power supply is, for example, about 100 V to 200 V. The switch unit 120 is connected to the power cord 110. Each of the switch unit 130 and the AC/DC power supply 140 is connected to the power cord 112.

The fixing unit 200 includes a heating roller 230 and a pressing roller 240 as a fixing member and heats and presses the sheet P conveyed to a fixing nip between both rollers so that the toner image on the sheet P is melt-fixed onto the front surface thereof. The heating roller 230 includes, for example, a core metal which is formed as a cylindrical metal member, an elastic layer which is formed on a surface of the core metal by a material such as silicone rubber or foamed silicone rubber, and a releasing layer which is formed of fluororesin in order from the inside. A first heater group 210 and a second heater group 220 are disposed inside the core metal. A length of the heating roller 230 in a rotation shaft direction (hereinafter, simply referred to as a "width direction") orthogonal to the conveying direction of the sheet P is set to an enough length capable of fixing the sheet P having a maximal sheet width which can be conveyed.

Figure 20:
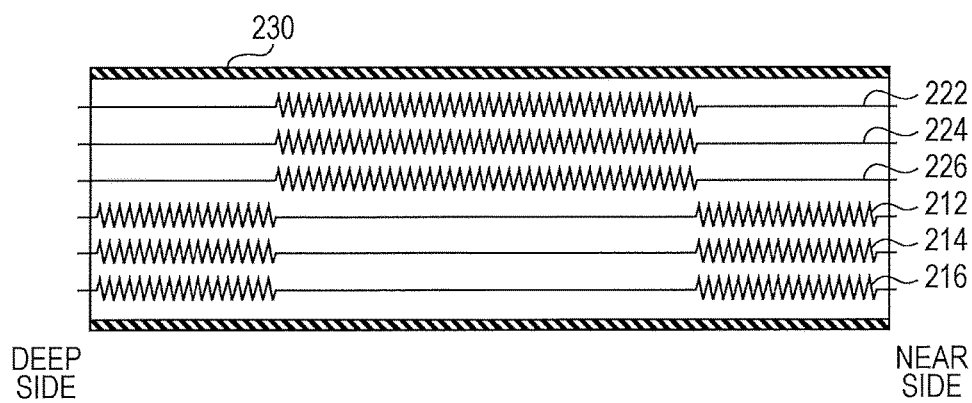
FIG. 20 is a diagram illustrating a heat generation amount distribution of a heater in the width direction of a heating roller.

The first heater group 210 includes three heaters 212, 214, and 216. As illustrated in FIG. 20, each of the heaters 212, 214, and 216 is disposed at, for example, an end portion of a fixing roller in the longitudinal direction. That is, the heaters 212, 214, and 216 having the same function (a first function) for the end portion are allocated to the first heater group 210. In the embodiment, the power of the heater 212 is 600 W, the power of the heater 214 is 800 W, and the power of the heater 216 is 700 W. In addition, the power of 600 W to 800 W corresponds to a first electric power amount.

The second heater group 220 includes three heaters 222, 224, and 226. As illustrated in FIG. 20, each of the heaters 222, 224, and 226 is disposed at, for example, a center portion of the fixing roller in the longitudinal direction. That is, the heaters 222, 224, and 226 having the same function (a second function different from the first function) can be allocated to the second heater group 220. In the embodiment, the power of the heater 222 is 1100 W, the power of the heater 224 is 1150 W, and the power of the heater 226 is 1000 W. In addition, the power of 1000 W to 1150 W corresponds to a second electric power amount.

The heaters 212, 214, 216, 222, 224, and 226 are, for example, halogen lamps and may be configured as heaters having a different heat distribution (light distribution characteristic) in response to a sheet width of a plurality of steps which can be fed by the image forming apparatus 100. Further, in FIG. 2, the heaters 212, 214, 216, 222, 224, and 226 are disposed to be gathered in the heater group in the circumferential direction of the heating roller 230, but, for example, the heaters 212, 214, and 216 constituting the first heater group 210 and the heaters 222, 224, and 226 constituting the second heater group 210 may be alternately arranged in the circumferential direction of the heating roller 230.

The switch unit 120 switches the first heater group 210 to be turned off by prohibiting the connection with the AC power supply or switches the first heater group 210 to be turned on by allowing the connection with the AC power supply. The switch unit 120 includes a switch board 122 and switches 124, 126, and 128 attached onto the switch board 122. One end portion of the switch 124 is connected to the power cord 110 and the other end portion thereof is connected to the heater 212. One end portion of the switch 126 is connected to the power cord 110 and the other end portion thereof is connected to the heater 214. One end portion of the switch 128 is connected to the power cord 110 and the other end portion thereof is connected to the heater 216. As the switches 124, 126, and 128, for example, a switching element such as a triac (bidirectional thyristor), a transistor, or an IGBT can be used.

The switch unit 130 switches the second heater group 220 to be turned off by prohibiting the connection with the AC power supply or switches the second heater group 220 to be turned on by allowing the connection with the AC power supply. The switch unit 130 includes a switch board 132 and switches 134, 136, and 138 mounted on the switch board 132. One end portion of the switch 134 is connected to the power cord 112 and the other end portion thereof is connected to the heater 222. One end portion of the switch 136 is connected to the power cord 112 and the other end portion thereof is connected to the heater 224. One end portion of the switch 138 is connected to the power cord 112 and the other end portion thereof is connected to the heater 226. As the switches 134, 136, and 138, for example, a switching element such as a triac (bidirectional thyristor), a transistor, or an IGBT can be used.

The AC/DC power supply part 140 converts AC power (AC) supplied from the power cord 112 into DC power (DC) and supplies the converted DC power to the controller 150 or other loads.

The temperature sensor 160 is disposed in the vicinity of the first heater group 210, detects a temperature of the heater 212 disposed at the end portion of the first heater group 210, and supplies the temperature information of the first heater group 210 to the controller 150.

The temperature sensor 162 is disposed in the vicinity of the second heater group 220, detects a temperature of the heater 222 disposed at the center portion of the second heater group 220, and supplies the temperature information of the second heater group 220 to the controller 150.

The controller 150 includes, for example, a central processing unit (CPU) or read only memory (ROM). The controller 150 calculates a duty ratio when control the lighting of the first heater group 210 from the temperature information of the first heater group 210 detected by the temperature sensor 160. Further, the controller 150 reads an array pattern corresponding to the calculated duty ratio from a table of the storage 170 and switches the on/off state of the switch unit 120 based on the read array pattern to perform the lighting control of the first heater group 210. This converting control is performed with the half wave cycle of the AC power supply. Also in the second heater group 220, the array pattern is determined by the same control to perform the lighting control.

The storage 170 has a table storing an array pattern corresponding to each duty ratio of the heaters 222, 224, and 226 of the second heater group 220 and the heaters 212, 214, and 216 of the first heater group 210. For example, any one of an off period designating the off state of the switch units 120 and 130 and an on period designating the on state is arranged every one half wave cycle so that the length of one lighting control section become an integral multiple of the half wave cycle. In other words, the length of an off period and the length of an on period are both made one half wave cycle.

[Array Pattern of Satisfying Flicker Specified Value]

In order to prevent the occurrence of the flicker, the array pattern for turning on or off the heaters in each heater group is set so as not to become a predetermined flicker specified value or more. For example, since the flicker occurs when the flicker specified value becomes 1.0 or more, the array pattern in which the flicker specified value becomes 1.0 or more cannot be used and the array pattern for turning on or off the heaters constituting the same heater group is set so that the flicker specified value becomes smaller than 1.0. Further, when the flicker specified value is 0.8 or more, since the value is near to 1.0, the flicker may occur in accordance with a variation in rated power of the heater. For this reason, the array pattern of which the flicker specified value is 0.8 or more is used carefully and is not used as much as possible.

FIGS. 21 to 23 are diagrams illustrating an example of an array pattern not satisfying the flicker specified value. FIGS. 24 to 26 are diagrams illustrating an array pattern satisfying the flicker specified value. As illustrated in FIGS. 21 to 26, when the array pattern for turning on or off the heaters constituting the same heater group is changed, it is possible to adjust the flicker specified value so that the flicker specified value does not become a predetermined flicker specified value or more without changing the duty ratio. In this way, the array pattern for turning on or off the heaters in each of the first heater group and the second heater group is set to satisfy the flicker specified value.

[Array Pattern]

FIG. 4 illustrates an array pattern (a current waveform) when controlling the lighting of the heater 212 of the first heater group 210 at the duty ratio of 53.3%, illustrates an array pattern when controlling the lighting of the heater 214 at the duty ratio of 26.7%, and illustrates an array pattern when controlling the lighting of the heater 216 at the duty ratio of 26.7%.

In addition, in the AC current waveform illustrated in FIG. 4, FIGS. 5 to 7, and FIGS. 10 to 17 to be described later, the on period (the light-on period) is indicated by "1" and the off period (the light-off period) is indicated by "0". Further, fifteen half wave cycles are used as one lighting control section (unit).

As illustrated in FIG. 4, three array patterns for turning on or off the heaters 212, 214, and 216 of the first heater group 210 are set by the number of lighting corresponding to the duty ratio and have a combination in which the array of the on period and the off period is adjusted to satisfy the flicker specified value (for example, pst=0.8).

FIG. 5 illustrates an array pattern (a current waveform) when controlling the lighting of the heater 222 of the second heater group 220 at the duty ratio of 93.3%, illustrates an array pattern when controlling the lighting of the heater 224 at the duty ratio of 26.7%, and illustrates an array pattern when controlling the lighting of the heater 226 at the duty ratio of 93.3%.

As illustrated in FIG. 5, three array patterns for turning on or off the heaters 222, 224, and 226 of the second heater group 220 are set by the number of lighting corresponding to the duty ratio and a combination of the array of the on period and the off period is adjusted to satisfy the flicker specified value (for example, pst=0.8).

FIG. 6 illustrates an array pattern in a case where only the duty ratio of the heater 216 in the first heater group 210 illustrated in FIG. 4 is changed from 26.7% to 40%.

As illustrated in FIG. 6, when only the duty ratio of the heater 216 of the first heater group 210 is changed from 26.7% to 40%, the array pattern for turning on or off the heater 216 is changed to satisfy a predetermined flicker regulation value and the array pattern is changed with the duty ratios of the remaining heaters 212 and 214 of the first heater group 210 unchanged.

In the embodiment, since the first heater group 210 is allocated to the power cord 110 and the second heater group 220 is allocated to the power cord 112, the flicker measurement of the first heater group 210 and the flicker measurement of the second heater group 220 can be separated. Accordingly, the duty ratio of the second heater group 220 does not need to be changed even when the duty ratio of the first heater group 210 is changed. As a result, it is possible to independently control the lighting of the first heater group 210 and the second heater group 220. In addition, the same effect can be obtained even when only the duty ratio of the second heater group 220 is changed.

FIG. 7 illustrates an array pattern in a case where only the duty ratio of the heater 216 of the first heater group 210 illustrated in FIG. 4 is changed from 26.7% to 53.3%.

As illustrated in FIG. 7, when only the duty ratio of the heater 216 of the first heater group 210 is changed from 26.7% to 53.3%, the array pattern for turning on or off the heater 216 is changed to satisfy a predetermined flicker regulation value and the array pattern for turning on or off the remaining heaters 212 and 214 of the first heater group 210 is changed with the duty ratio unchanged.

Also in this case, since the first heater group 210 and the second heater group 220 have independent configurations as described above, there is no need to change the duty ratio of the second heater group 220 even when the duty ratio of the first heater group 210 is changed.

[Operation Example of Image Forming Apparatus 100]

Figure 8:
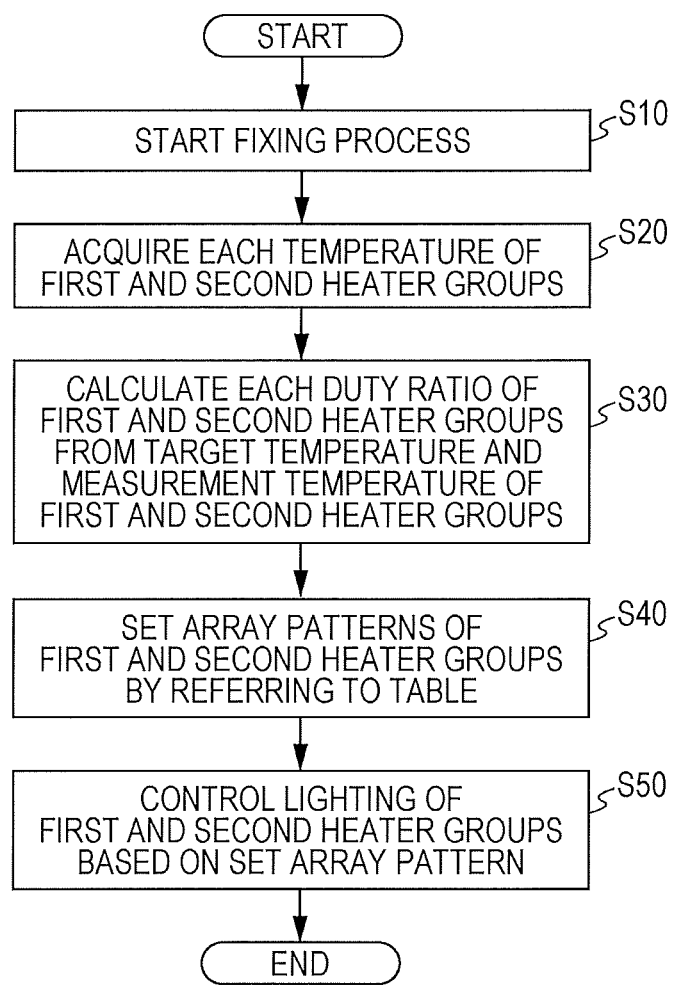
FIG. 8 is a flowchart illustrating an example of an operation of the image forming apparatus during a fixing process.

FIG. 8 is a flowchart illustrating an example of an operation of the image forming apparatus 100 during a fixing process.

As illustrated in FIG. 8, in step S10, the controller 150 starts a fixing process as a job starts. When step S10 ends, the routine proceeds to step S20.

In step S20, the controller 150 acquires a temperature of the first heater group 210 from the temperature sensor 160 and acquires a temperature of the second heater group 220 from the temperature sensor 162. When step S20 ends, the routine proceeds to step S30.

In step S30, the controller 150 calculates a duty ratio when controlling the lighting of the first heater group 210 based on a temperature difference value between the target temperature and the acquired temperature of the first heater group 210. Similarly, the controller 150 calculates a duty ratio when controlling the lighting of the second heater group 220 based on the temperature difference value between the predetermined target temperature and the acquired temperature of the second heater group 220. In addition, the duty ratios of the first heater group 210 and the second heater group 220 can be calculated by a method such as a PI control using a past temperature history. When step S30 ends, the routine proceeds to step S40.

In step S40, the controller 150 sets the array pattern corresponding to the duty ratio of the calculated first heater group 210 by selecting the array pattern from the table of the storage 170. Similarly, the controller 150 sets the array pattern corresponding to the duty ratio of the calculated second heater group 220 by selecting the array pattern from the table of the storage 170. When step S40 ends, the routine proceeds to step S50.

In step S50, the controller 150 controls the lighting of the first heater group 210 based on the set array pattern. Similarly, the controller 150 controls the lighting of the second heater group 220 based on the set array pattern.

[Operation Example in Case of Determining Duty Ratio]

Figure 9:
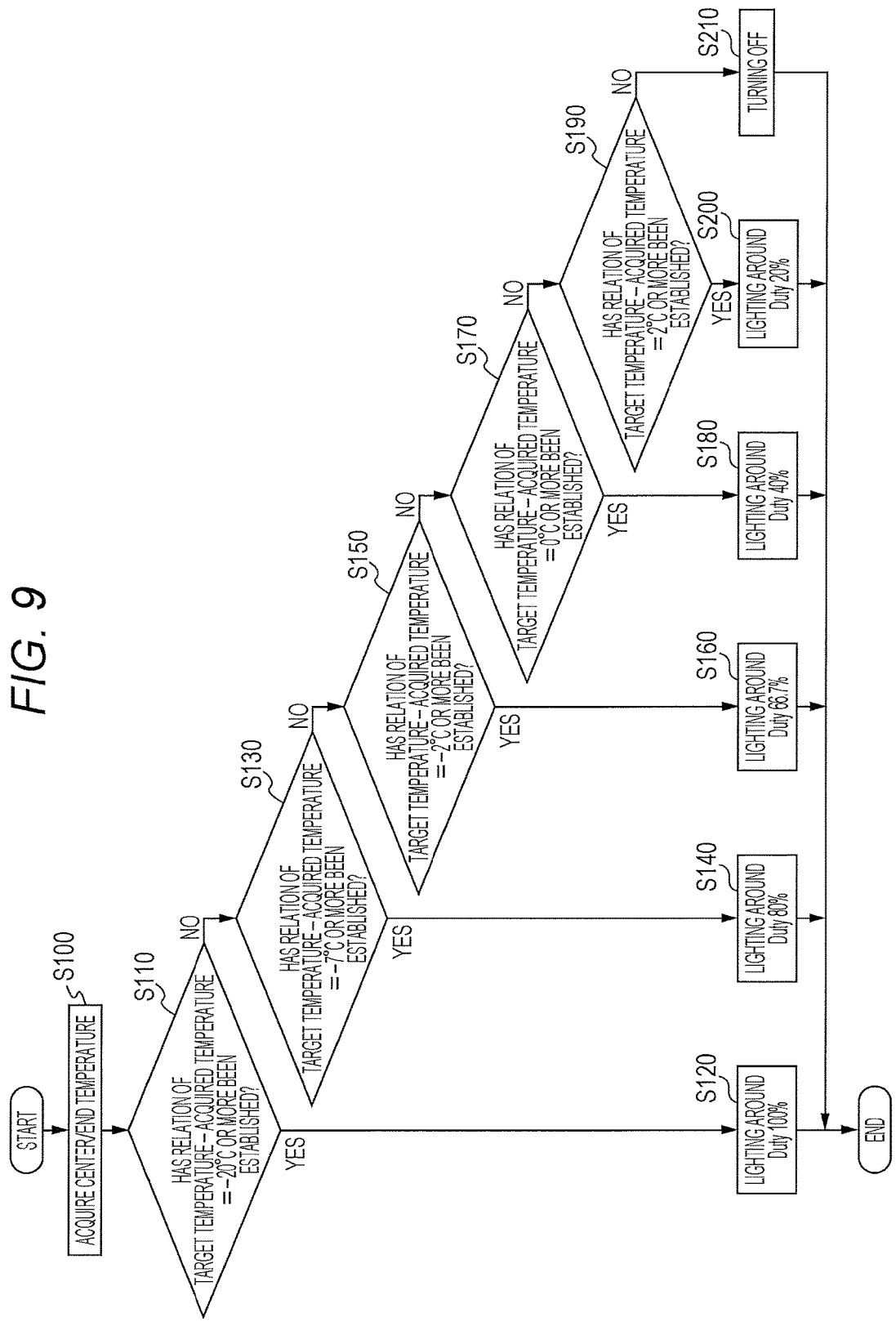
FIG. 9 is a flowchart illustrating an example of an operation of the image forming apparatus in a case where a duty ratio of the first heater group or the like is determined.

FIG. 9 is a flowchart illustrating an example of an operation of the image forming apparatus 100 when determining the duty ratio of the first heater group 210 or the like. Further, FIG. 10 illustrates an array pattern in a case where the duty ratio of the first heater group 210 is 80%, FIG. 11 illustrates an array pattern in a case where the duty ratio of the first heater group 210 is 66.7%, FIG. 12 illustrates an array pattern in a case where the duty ratio of the first heater group 210 is 40%, and FIG. 13 illustrates an array pattern in a case where the duty ratio of the first heater group 210 is 20%.

As illustrated in FIG. 9, in step S100, the controller 150 acquires the temperature information of the first heater group 210 for heating the end portion from the temperature sensor 160 and acquires the temperature information of the second heater group 220 for heating the center portion from the temperature sensor 162. When step S100 ends, the routine proceeds to step S110. Further, in the description below, for convenience of description, the case of determining a duty ratio when controlling the lighting of the first heater group 210 will be described.

In step S110, the controller 150 calculates a temperature difference by subtracting a temperature acquired from the temperature sensor 160 from the target temperature for the fixing control and determines whether the calculated temperature difference is −20° C. or more. That is, it is determined whether an environmental temperature of the image forming apparatus 100 in use is lower than the target temperature by 20° C. or more. When the controller 150 determines that the calculated temperature difference is −20° C. or more, the routine proceeds to step S120.

In step S120, the controller 150 sets a duty ratio when controlling the lighting of the first heater group 210 to about 100% from the calculated temperature difference and controls the lighting of the first heater group 210 based on the array pattern corresponding to the duty ratio.

Meanwhile, in step S110, when the controller 150 determines that the calculated temperature difference is smaller than −20° C., the routine proceeds to step S130.

In step S130, the controller 150 calculates a temperature difference by subtracting a temperature acquired from the temperature sensor 160 from the target temperature for the fixing control and determines whether the calculated temperature difference is equal to or larger than −7° C. That is, it is determined whether the environmental temperature of the image forming apparatus 100 is use is lower than the target temperature by 7° C. or more. When the controller 150 determines that the calculated temperature difference is −7° C. or more, the routine proceeds to step S140.

In step S140, the controller 150 sets a duty ratio when controlling the lighting of the first heater group 210 to about 80% from the calculated temperature difference and controls the lighting of the first heater group 210 based on the array pattern illustrated in FIG. 10 and corresponding to the duty ratio.

Meanwhile, in step S130, when the controller 150 determines that the calculated temperature difference is smaller than −7° C., the routine proceeds to step S150.

In step S150, the controller 150 calculates a temperature difference by subtracting a temperature acquired from the temperature sensor 160 from the target temperature for the fixing control and determines whether the calculated temperature difference is equal to or larger than −2° C. That is, it is determined whether the environmental temperature of the image forming apparatus 100 is use is lower than the target temperature by 2° C. or more. When the controller 150 determines that the calculated temperature difference is −2° C. or more, the routine proceeds to step S160.

In step S160, the controller 150 sets a duty ratio when controlling the lighting of the first heater group 210 to about 66.7% from the calculated temperature difference and controls the lighting of the first heater group 210 based on the array pattern illustrated in FIG. 11 and corresponding to the duty ratio.

Meanwhile, in step S150, when the controller 150 determines that the calculated temperature difference is smaller than −2° C., the routine proceeds to step S170.

In step S170, the controller 150 calculates a temperature difference by subtracting a temperature acquired from the temperature sensor 160 from the target temperature for the fixing control and determines whether the calculated temperature difference is equal to or larger than 0° C. That is, it is determined whether a difference between the environmental temperature at which the image forming apparatus 100 is used and the target temperature is equal to or larger than 0° C. and smaller than 2° C. When the controller 150 determines that the calculated temperature difference is 0° C. or more, the routine proceeds to step S180.

In step S180, the controller 150 sets a duty ratio when controlling the lighting of the first heater group 210 to about 40% from the calculated temperature difference and controls the lighting of the first heater group 210 based on the array pattern illustrated in FIG. 12 and corresponding to the duty ratio.

Meanwhile, in step S170, when the controller 150 determines that the calculated temperature difference is smaller than 0° C., the routine proceeds to step S190.

In step S190, the controller 150 calculates a temperature difference by subtracting a temperature acquired from the temperature sensor 160 from the target temperature for the fixing control and determines whether the calculated temperature difference is equal to or larger than 2° C. When the controller 150 determines that the calculated temperature difference is 2° C. or more, the routine proceeds to step S200.

In step S200, the controller 150 sets a duty ratio when controlling the lighting of the first heater group 210 to about 20% from the calculated temperature difference and controls the lighting of the first heater group 210 based on the array pattern illustrated in FIG. 13 and corresponding to the duty ratio.

Meanwhile, in step S190, when the controller 150 determines that the calculated temperature difference is smaller than 2° C., the routine proceeds to step S210. In step S210, the controller 150 turns off the first heater group 210 and the second heater group 220 since the acquired temperature is the target temperature or more.

[Configuration Example of Heater in Case of Duty Ratio of 20%]

Next, an example of a combination of the heaters in a case where a duty ratio when controlling the lighting of the first heater group 210 is 20% will be described. For example, when the calculated duty ratio is 20%, the following heater configuration can be adopted in addition to a case where three heaters 212, 214, and 216 illustrated in FIG. 13 are used.

FIG. 14 illustrates the array pattern for turning on or off the heater 214 when one heater 214 of the first heater group 210 is used. FIG. 15 illustrates the array pattern for turning on or off the heaters 212 and 214 when two heaters 212 and 214 of the first heater group 210 are used.

In the controller 150, the total power corresponds to 420 W in the case of the first heater group 210 when the calculated duty ratio is 20%. For that reason, since the total power of the first heater group 210 may be 420 W, the lighting control may be performed by using, for example, only one heater 212. In this case, the array pattern illustrated in FIG. 14 is selected so that the heater 214 of 800 W is controlled to light up at the duty ratio of 53.3%. The total power of the first heater group 210 becomes 424 W.

Further, for example, when the lighting control is performed by using only two heaters 212 and 214, the controller 150 selects the array pattern illustrated in FIG. 15 so that the lighting of the heater 212 of 600 W is controlled at the duty ratio of 33% and the lighting of the heater 214 of 800 W is controlled at the duty ratio of 26.7%. The total power of the first heater group 210 becomes 411.6 W.

Additionally, various heater configurations can be adopted by the same method even when the duty ratios are different. Further, in the above-described example, the case of the first heater group 210 has been described, but the same array pattern can be adopted also in the second heater group 220.

As described above, according to the first embodiment, since the first heater group 210 is allocated to the power cord 110 and the second heater group 220 is allocated to the power cord 112, the first heater group 210 and the second heater group 220 can be independently controlled to light up by the unit of the half wave cycle. Accordingly, since there is no need to change the duty ratio and the array pattern of the second heater group 220, for example, even when the duty ratio of the heater 212 of the first heater group 210 is changed, the lighting control can be simplified.

Further, since the array patterns for turning on or off the heaters 212, 214, and 216 of the first heater group 210 and the array patterns for turning on or off the heaters 222, 224, and 226 of the second heater group 220 have a combination of satisfying the flicker regulation value, it is possible to effectively prevent the occurrence of the flicker.

Further, for example, when the end heating heater has a combination of the first heater group 210 and the second heater group 220, there is a need to change both array patterns for turning on or off the first heater group 210 and the second heater group 220 when changing the duty ratio (the control value) of the end heating heater and thus a problem arises in that the lighting control becomes complicated. On the contrary, according to the embodiment, since the end heating heater is allocated to the first heater group 210 and the center heating heater is allocated to the second heater group 220, only the array pattern for turning on or off the heaters of the first heater group 210 may be changed, for example, when changing the duty ratio of the end heating heater and thus the lighting control can be simplified.

Second Embodiment

A second embodiment is different from the first embodiment in that the array pattern for turning on or off the heaters is selected in consideration of the flicker standard. Further, since the other configurations of the image forming apparatus 100 are the same as those of the first embodiment, the same reference numerals will be given to the common components and a detailed description thereof will be omitted.

At the rated current smaller than 16 A per phase of the power cord, a flicker test is performed according to the IEC61000-3-3 standard (a first flicker standard). In this case, the measuring instrument side impedance is 0.4 Ω and the flicker value is measured by determining a change in voltage using the impedance. Further, at the rated current equal to or larger than 16 A per phase of the power cord, a flicker test is performed according to the IEC61000-3-11 standard (a second flicker standard). In this case, the measuring instrument side impedance is 0.25 Ω and the flicker value is measured by determining a change in voltage using the impedance.

FIG. 16 illustrates a measurement result of the flicker standard and an array pattern in a case where the duty ratios of the heaters 212, 214, and 216 of the first heater group 210 are 26.7%. Additionally, in FIG. 16, the IEC61000-3-3 standard is referred to as a standard A and the IEC61000-3-11 standard is referred to as a standard B.

In the flicker measurement of the IEC61000-3-3 standard, the flicker measurement result (PST) is 0.715 when the lighting control of the first heater group 210 is performed according to the array pattern illustrated in FIG. 16. Further, in the flicker measurement of the IEC61000-3-11 standard, the flicker measurement result (PST) is 0.451 when the lighting control of the first heater group 210 is performed according to the array pattern illustrated in FIG. 16. As obvious from these, there is a difference in flicker value when the flicker standard is different while the array pattern is the same.

Here, when the target value of the flicker value (PST) is set to, for example, 0.8 or less, any flicker standard can be selected since the flicker value becomes 0.8 or less in both standards of the IEC61000-3-3 standard and the IEC61000-3-11 standard in the array pattern illustrated in FIG. 16.

FIG. 17 illustrates an array pattern in a case where the duty ratio of the heater 212 of the first heater group 210 is 20%, an array pattern in a case where the duty ratio of the heater 214 is 26.7%, an array pattern in a case where the duty ratio of the heater 216 is 46.7%, and a measurement result of each flicker standard. Additionally, in FIG. 17, the IEC61000-3-3 standard is referred to as a standard A the IEC61000-3-11 standard is referred to as a standard B.

In the flicker measurement of the IEC61000-3-3 standard, the flicker measurement result (PST) becomes 0.891 which is larger than the target value of 0.8 when the lighting control of the first heater group 210 is performed according to the array pattern illustrated in FIG. 17. Meanwhile, in the flicker measurement of the IEC61000-3-11 standard, the flicker measurement result (PST) becomes 0.745 which is equal to or smaller than the target value of 0.8 when the lighting control of the first heater group 210 is performed according to the array pattern illustrated in FIG. 17. Accordingly, it is proved that the array pattern illustrated in FIG. 17 cannot be selected in the IEC61000-3-3 standard.

Further, in FIG. 2, when the rated current of the power cord 110 is 15 A and the rated current of the power cord 112 is 20 A, the flicker standard of the power cord 110 corresponds to the IEC61000-3-3 standard in which the rated current is smaller than 16 A and the flicker standard of the power cord 112 corresponds to the IEC61000-3-11 standard in which the rated current is equal to or larger than 16 A. Further, when the array pattern of FIG. 17 is selected, the power cord 112 corresponding to the IEC61000-3-11 standard and satisfying a condition in which the target value of the flicker value is 0.8 or less is selected as the power cord and the lighting control of the second heater group 220 connected to the power cord 112 is performed.

Third Embodiment

In a third embodiment, a combination of the heaters of the first heater group 210 and the second heater group 220 is determined in consideration of the rated current of the power cord. Further, since the other configurations of the image forming apparatus 100 are the same as those of the first embodiment, the same reference numerals will be given to the common components and a detailed description thereof will be omitted.

As described above with reference to FIG. 3 or the like in the first embodiment, the power of the heater 212 is set to 600 W, the power of the heater 214 is set to 800 W, the power of the heater 216 is set to 700 W, the power of the heater 222 is set to 1100 W, the power of the heater 224 is set to 1150 W, and the power of the heater 226 is set to 1000 W. Further, as the power other than the heater, the power of the AC/DC power supply is set to 800 W. Among these, a control system is 200 W and a drive system is 600 W.

In the case of such a condition, in the embodiment, the heaters 212, 214, and 216 operated by the power smaller than 1000 W are allocated to the first heater group 210 and the heaters 222, 224, and 226 operated by the power equal to or larger than 1000 W are allocated to the second heater group 220. In other words, in the first heater group 210 and the second heater group 220, three heaters 212, 214, and 216 having a small electric power amount are allocated to the first heater group 210 and three heaters 222, 224, and 226 having a large electric power amount are allocated to the second heater group 220.

Here, 15 A, 20 A, 25 A, and 30 A are generally set as the rated current of the power cord (the plug). In this case, the total power amount of the first heater group 210 and the AC/DC power supply part 140 at the side of the power cord 110 becomes 2900 W. Since the rated voltage is set to 200 V in Japan, the rated current becomes 14.5 A. Thus, the power cord of 15 A having a small rated current can be selected as the power cord 110.

Further, the total power amount of the second heater group 220 at the side of the power cord 112 becomes 3250 W. Since the rated voltage is set to 200 V in Japan, the rated current becomes 16.25 A. Thus, the power cord of 20 A having a large rated current can be selected as the power cord 112.

Figure 18:
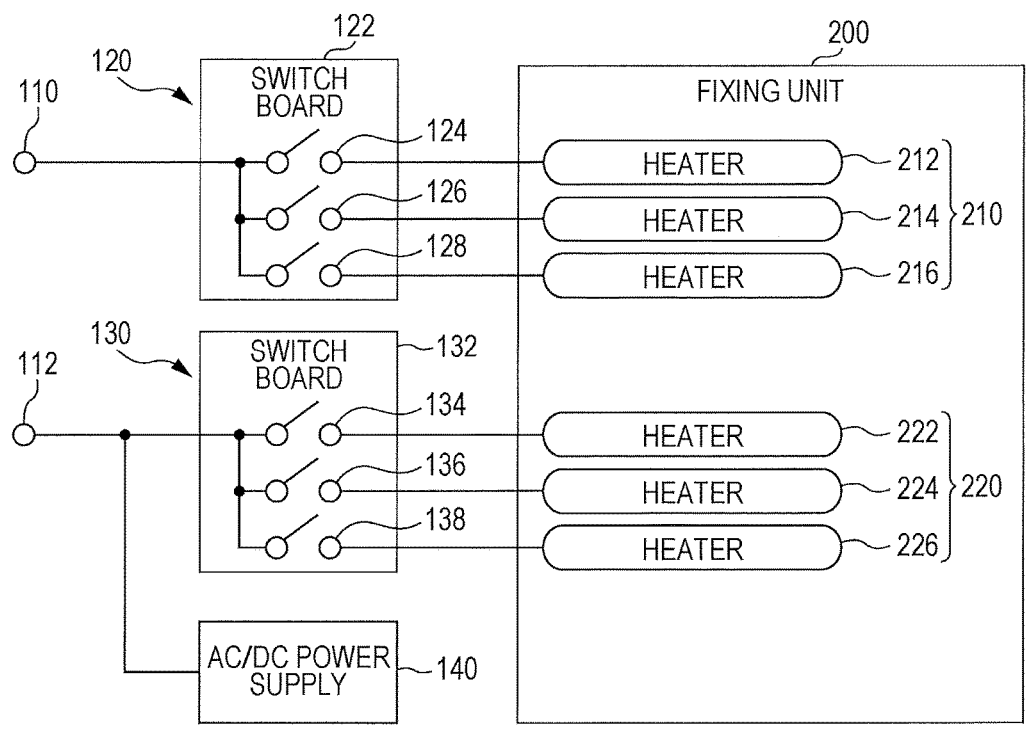
FIG. 18 is a block diagram illustrating an example of a functional configuration of another image forming apparatus according to a third embodiment of the present invention.

FIG. 18 is a block diagram illustrating an example of a functional configuration of another image forming apparatus 100 according to the third embodiment. In FIG. 18, the AC/DC power supply part 140 is connected to the power cord 112.

As illustrated in FIG. 18, the total power amount of the first heater group 210 at the side of the power cord 110 becomes 2100 W. Since the rated voltage is set to 230 V in Europe, the rated current becomes 9.13 A. Thus, the power cord having a rated current of 15 A can be selected as the power cord 110.

Further, the total power amount of the second heater group 220 and the AC/DC power supply part 140 at the side of the power cord 112 becomes 4050 W. Since the rated voltage is set to 230 V in Europe, the rated current becomes 17.6 A. Thus, the power cord having a rated current of 20 A can be selected as the power cord 112.

Fourth Embodiment

In a fourth embodiment, the power cords 110 and 112 are determined in consideration of the currents of the first heater group 210 and the second heater group 220. Further, since the other configurations of the image forming apparatus 100 are the same as those of the first embodiment, the same reference numerals will be given to the common components and a detailed description thereof will be omitted.

Figure 19:
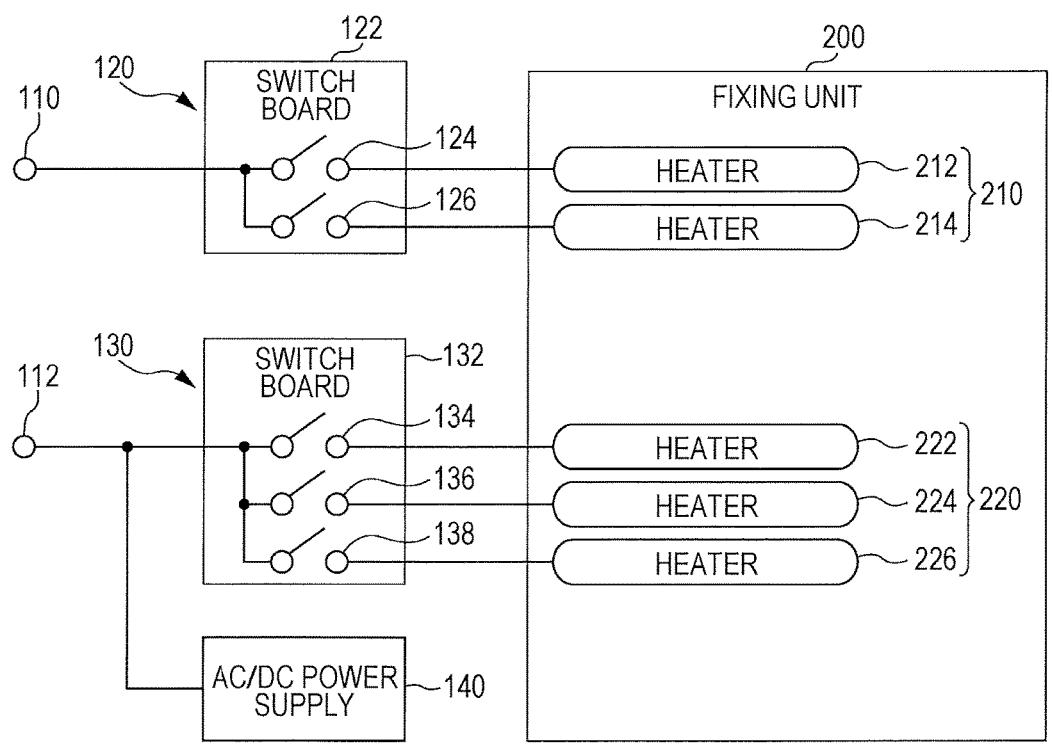
FIG. 19 is a block diagram illustrating an example of a functional configuration of another image forming apparatus according to a fourth embodiment of the present invention.

FIG. 19 is a block diagram illustrating an example of a functional configuration of the image forming apparatus 100 according to the fourth embodiment. As illustrated in FIG. 19, the first heater group 210 of the fixing unit 200 includes two heaters 212 and 214. The power cord 110 is connected to the AC power supply of 120 V/60 Hz and the power cord 112 is connected to the AC power supply of 230 V/50 Hz. In addition, the power of the heaters is common to the first embodiment except that the heater 216 of the first heater group 210 is not provided.

When the fixing unit 200 is obtained as illustrated in FIG. 19, the total power amount of the first heater group 210 at the side of the power cord 110 becomes 1400 W and the total power amount of the second heater group 220 and the AC/DC power supply part 140 at the side of the power cord 112 becomes 4050 W.

In general, when the power supplied to the load is the same, a current increases when a voltage is small. Here, in the fourth embodiment, in order to suppress an increase in current of each of the first heater group 210 and the second heater group 220, the first heater group 210 having a small total power is allocated to the power cord 110 of 120 V/60 Hz and the second heater group 220 having a large total power is allocated to the power cord 112 of 230 V/50 Hz. Accordingly, it is possible to prevent an increase in current of the power cords 110 and 112. Further, even when all AC power supplies of 200 V are used, the AC power supply of 100 V can be used instead.

Additionally, the embodiments of the present invention have been described, but the technical scope of the present invention is not limited to the scope of the above-described embodiments. Various modifications or improvements can be made on the above-described embodiments without departing from the spirit of the present invention. For example, the image forming apparatus 100 illustrated in FIG. 1 is used to form a color image, but the present invention is not limited to the image forming apparatus for forming a color image. For example, the present invention can be also applied to the image forming apparatus for forming a monochrome image.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
   a fixer that includes a first heater group including a plurality of first heaters and a second heater group including a plurality of second heaters;
   a first power cord that supplies AC power to the first heater group;
   a second power cord that supplies AC power to the second heater group;
   a plurality of first switches that is provided between the first heaters and the first power cord and switches a power supply state to the first heaters;
   a plurality of second switches that is provided between the second heaters and the second power cord and switches a power supply state to the second heaters; and
   a hardware processor that independently controls the lightings of the first and second heater groups by controlling the plurality of first and second switches based on an array pattern for turning on or off the first and second heaters,
   wherein the array pattern for turning on or off the first and second heaters comprises an on period and an off period whose lengths are both a half wave cycle of an AC power supply, and is set to satisfy a flicker regulation value.

2. The image forming apparatus according to claim 1, wherein the hardware processor controls the lighting of the first heater group by controlling the plurality of first switches based on an array pattern for turning on or off the first heaters and controls the lighting of the second heater group by controlling the plurality of second switches based on an array pattern for turning on or off the second heaters.

3. The image forming apparatus according to claim 1, wherein the hardware processor sets the array pattern for turning on or off the first and second heaters to satisfy a first flicker standard applied to an image forming apparatus having a rated current smaller than 16 A.

4. The image forming apparatus according to claim 1, wherein the hardware processor sets the array pattern for turning on or off the first and second heaters to satisfy a second flicker standard applied to an image forming apparatus having a rated current equal to or larger than 16 A.

5. The image forming apparatus according to claim 1, wherein the first power cord and the second power cord have different rated currents.

6. The image forming apparatus according to claim 5, wherein AC power supplied by the first power cord and AC power supplied by the second power cord have different voltages.

7. The image forming apparatus according to claim 1, wherein a heater having a first function is allocated to the first heater group, and
   a heater having a second function different from the first function is allocated to the second heater group.

8. The image forming apparatus according to claim 1, wherein a heater having a first electric power amount is allocated to the first heater group, and
   a heater having a second electric power amount larger than the first electric power amount is allocated to the second heater group.

9. The image forming apparatus according to claim 1, wherein the plurality of first heaters has different electric power amounts respectively.

10. The image forming apparatus according to claim 1, wherein the plurality of second heaters has different electric power amounts respectively.

11. The image forming apparatus according to claim 1, wherein each of the first and second heater groups includes three heaters.

12. The image forming apparatus according to claim 1, further comprising:
a storage that stores the array pattern for turning on or off the first and second heaters.

13. The image forming apparatus according to claim 1, wherein an AC/DC power supply that converts AC power into DC power is connected to the first power cord or the second power cord.

* * * * *